(12) United States Patent
Delikostas et al.

(10) Patent No.: US 9,709,205 B2
(45) Date of Patent: Jul. 18, 2017

(54) PRESS SEAL HAVING A PRESS BODY

(71) Applicant: Hauff-Technik GmbH & Co. KG, Hermaringen (DE)

(72) Inventors: Christos Delikostas, Giengen (DE); Ralf Kurz, Giengen (DE)

(73) Assignee: Hauff-Technik GmbH & Co. KG (DE)

( * ) Notice: Subject to any disclaimer, the term of this patent is extended or adjusted under 35 U.S.C. 154(b) by 6 days.

(21) Appl. No.: 14/907,213

(22) PCT Filed: Jun. 10, 2014

(86) PCT No.: PCT/EP2014/062041
§ 371 (c)(1),
(2) Date: Jan. 22, 2016

(87) PCT Pub. No.: WO2015/010822
PCT Pub. Date: Jan. 29, 2015

(65) Prior Publication Data
US 2016/0195210 A1 Jul. 7, 2016

(30) Foreign Application Priority Data
Jul. 22, 2013 (EP) .................................. 13177472

(51) Int. Cl.
*F16L 5/08* (2006.01)
*F16L 55/132* (2006.01)
*H02G 3/22* (2006.01)

(52) U.S. Cl.
CPC .............. *F16L 55/132* (2013.01); *F16L 5/08* (2013.01); *H02G 3/22* (2013.01); *F16L 2201/10* (2013.01)

(58) Field of Classification Search
CPC ....... F16L 55/132; F16L 5/08; F16L 2201/10; H02G 3/22; F16B 31/02
(Continued)

(56) References Cited

U.S. PATENT DOCUMENTS 3,528,668 A * 9/1970 Barton ................ F16J 15/00
277/606
5,249,604 A * 10/1993 Keating ................ F16L 55/11
138/89
(Continued)

FOREIGN PATENT DOCUMENTS

EP 1211450 A1 6/2002
WO 96/35904 A1 11/1996

OTHER PUBLICATIONS

Written Opinion in corresponding PCT application No. PCT/EP2014/062041.
(Continued)

*Primary Examiner* — King M Chu
(74) *Attorney, Agent, or Firm* — Wood, Phillips, Katz, Clark & Mortimer

(57) ABSTRACT

The invention relates to a press body (1), adapted for a press seal having an elastomer body (91) for contacting a conduit sealingly, said press body (1) and a tensioning bolt (212) for tensioning said press body (1), wherein said press body (1) can be pressed onto said elastomer body (91) by tensioning said tensioning bolt (212) in such a way that said elastomer body contacts said conduit sealingly, and wherein further said press body (1) comprises a read out member at which a force transmitted to said elastomer body (1) during said tensioning of said tensioning bolt (212) can be read out.

13 Claims, 9 Drawing Sheets

(58) Field of Classification Search
USPC .......................................................... 220/780
See application file for complete search history.

(56) References Cited

U.S. PATENT DOCUMENTS

| | | | | |
|---|---|---|---|---|
| 5,297,691 A | * | 3/1994 | Bottcher ............... | F16L 55/132 138/89 |
| 5,437,310 A | * | 8/1995 | Cunningham ...... | F16L 55/1141 138/89 |
| 6,003,557 A | * | 12/1999 | Brelig .................. | F16L 55/136 138/89 |

OTHER PUBLICATIONS

International Search Report in corresponding PCT application No. PCT/EP2014/062041.

* cited by examiner

PRESS SEAL HAVING A PRESS BODY

FIELD OF THE INVENTION

The present invention relates to a press seal having an elastomer body for contacting a conduit sealingly, a press body and a tensioning bolt for tensioning the press body.

BACKGROUND OF THE INVENTION

From the prior art, press seals are known having an elastomer body being compressed between two press bodies along the conduit direction and, in consequence, contacting in directions perpendicular thereto the conduit and for instance a soffit of a wall opening, namely for instance an inner lateral surface of a core drilling. However, this is only one among various possibilities for mounting a press seal, which shall illustrate an application but not limit the invention explained below.

BRIEF SUMMARY OF THE INVENTION

The problem the invention is to solve is to provide an advantageous embodiment of a press seal having an elastomer body and a press body.

According to the invention, this problem is solved by a press seal having an elastomer body for contacting a conduit sealingly, a press body and a tensioning bolt for tensioning said press body, wherein said press body can be pressed onto said elastomer body by tensioning said tensioning bolt in such a way that said elastomer body contacts said conduit sealingly, and wherein further said press body comprises a read out member at which a force transmitted to said elastomer body during said tensioning of said tensioning bolt can be read out.

For a fitter mounting the press seal for instance on a construction site on a conduit fed through a wall or floor element, the readout member is a means allowing advantageously an evaluation of the force transferred from the press body onto the elastomer body, namely of the contact pressure of the press body and therewith of a contact pressure caused by the elastomer body on the conduit, thus. For instance, the fitter can ensure that the elastomer body contacts the conduit sealingly.

Therein, the readout member is preferably a part of the press body, which cannot get lost in the application, namely is structurally integrated into the press body so that it is undetachable at least in the assembled state of the press seal. On the one hand, this simplifies the handling and, on the other hand, it assures that the readout member is actually available when the press seal is mounted then, which reduces the risk of an error in the application.

The visualization of the contact pressure transferred from the press body onto the elastomer body is, with respect to checking the sealing contact of the elastomer body at the conduit, advantageous because the contact pressure between the elastomer body and the conduit is linked to the contact pressure transferred from the press body onto the elastomer body. The inventors found out that in practice a combination of press seal and conduit is sometimes chosen in such a way that the diameter of the conduit is out of an optimum range, namely is too small. Accordingly, for a sealing contact, an increased deformation of the elastomer body is required. The readout member showing the pressure transferred from the press body onto the elastomer body can provide an assessment of the contact between the elastomer body and the conduit also in such a case, because the contact pressure between the press body and the elastomer body depends also on the contact pressure between the elastomer body and the conduit.

The conduit can be sealed against a surface defining a "through-opening" which can for instance be a through-opening in a wall or floor element or in a tube element in general, for instance in a protective tube in which the actual conduit is led or in a mounting element provided for mounting the conduit. The through-opening can for instance be "defined" by the material of the wall, floor, tube or mounting element itself; however, a frame or sleeve can also be provided in the through-opening and be contacted by the elastomer body.

The "conduit" can be in particular an electric line, a media line, for instance a gas, water or oil line, or a telecommunication line, in particular on a fibre optical basis, or also a hollow tube for receiving such a line. Preferably, the conduit is circular in a section perpendicular to the conduit direction, particularly preferred this applies also for the through-opening, wherein the elastomer body is arranged in an annular space further preferred (and seals inwards against the conduit and outwards against the surface defining the through-opening).

Further preferred embodiments of the invention are provided in the dependent claims and the description below which relates equally to the press seal, a corresponding press body and respective methods and methods of using; implicitly, the disclosure relates to all claims categories.

In a preferred embodiment, the press body comprises a first press body part and a second press body part which are adapted for being movable relatively to each other while being mounted via a deformation member. In an assembled press seal, the tensioning bolt contacts the first press body part and transmits a force thereon when being tensioned for pressing the elastomer body against the conduit ("tensioning" relates to a tensioning of the tensioning bolt, which causes a deformation of the elastomer body). The "contact transmitting a force" of the tensioning bolt can in general also occur at a thread integrated into the press body; preferably, it occurs at an areal contact of the tensioning bolt at the press body (wherein for instance a washer is considered as a part of the "tensioning bolt"). The second press body part is adapted for contacting the elastomer body and preferably it contacts the elastomer body when the press seal is assembled.

The "second press body part" can be provided in two different types. On the one hand, it can be a press body part contacting the elastomer body but transmitting basically no contact pressure thereon, the press body part being a readout member preferably provided as a readout pin (see for instance FIGS. 2 and 7); such a second press body part is referred to as "readout press body part" below. The readout press body part has a comparably small contact surface on the elastomer body, for instance of not more than 20%, 15% or 10% referring to the contact surface of the press body part as a whole.

The readout press body part is, in comparison to an initial state, moved into a different relative position by the elastomer body which presses onto the readout press body part with increasing contact pressure of the (remaining) press body and displaces the readout press body part, typically in a direction opposite to the direction of the pressing-on-movement. In some respect, the contact surface of the remaining press body has a "hole" in the region of the readout press body part, through which the tensioned elastomer body can be pressed to some extent; thus, the elastomer body can bulge "into" the press body, therein being intersected by a sectional plane containing the contact surface of the remaining press body, wherein the elastomer body displaces the readout press body part accordingly.

On the other hand, the second press body part can also be designed for the actual transmission of the contact pressure onto the elastomer body (see for instance FIGS. 3 and 5), namely have a large contact area to and transmit the force onto the elastomer body, which causes the elastomer body's deformation and its contact to the conduit. For this reason, a corresponding second press body part is referred to as "pressing press body part". In a preferred embodiment, an area of the "large" contact surface amounts to at least 50%, in this order increasingly preferred at least 60%, 70%, 80% or 90%, of an area of a projected press body area; therein, the latter is a result of a vertical projection of the whole press body into a plane perpendicular to the conduit direction.

In this disclosure, as far as reference is made to the "second press body part" or "the two press body parts" (first and second) without a further specification, this relates to both options "pressing press body part"/"readout press body part" and the respective features shall be disclosed with respect to both options.

In general, the first and the second press body part are preferably movable relatively to each other in the conduit direction, particularly preferred solely in the conduit direction; in general, the tensioning bolt preferably intersects the press body, particularly preferred solely in the conduit direction; in general, the tensioning bolt preferably intersects the elastomer body, particularly preferred solely in the conduit direction; in general, the contact surface between the tensioning bolt and the press body preferably extends perpendicularly to the conduit direction; in general, the contact surface between the press body, in particular the second press body part, and the elastomer body preferably extends perpendicularly to the conduit direction.

A "component" of the press body can for instance have a contact surface with at least one of the elastomer body and the tensioning bolt, preferably a contact surface lying perpendicularly to the conduit direction, and/or be held partly within such a component/such components. Preferably, the first and the second press body part can engage with each other, wherein this engagement can limit the movability relatively to each other like a stop (see FIG. 3); a stop limiting the movability of the first and the second press body part relatively to each other can be also preferred independently of an engagement of the press body parts (see FIG. 2).

The deformation member can deform in dependence of the contact pressure transferred to the elastomer body so that the two press body parts can be in different relative positions to each other in dependence of the contact pressure transferred to the elastomer body. Upon reaching a certain pressure, the relative position is different from a relative position in a (not tensioned) initial state. The relative position and the contact pressure transferred to the elastomer body thus can be read out at the readout member, namely at least as a qualitative characteristic of a minimum contact pressure.

In general, the relative movement between the first and the second press body part does, in its mounting via the deformation element, not necessarily occur in a continuous manner but the deformation can also happen abruptly ("digitally") upon reaching a certain force. Thereto, the relative movement could for instance be blocked by a deformation element being almost rigid, for instance by a material bridge between the two press body parts; at a certain pressure, the rigid deformation element can break or rip. After the deformation which would be irreversible in this case, the two press body parts have another relative position so that reaching a certain force can be read out at the readout member in consequence.

In general, the two press body parts can also be one-piece, namely monolithic without a material interface in between, for instance be parts connected by a connecting region which could be kind of a hinge. However, preferably, the two press body parts are multi-piece to each other (not monolithic); further preferred, the deformation member is multi piece with both press body parts respectively.

In a preferred embodiment, an elastic deformation member is provided, namely a deformation member returning into its initial state upon removal of a load acting during the tensioning of the tensioning bolt (as far as no excessive stress level is applied); thus, "elastically" means reversibly in general. Therein, the elastic deformation member is not the elastomer body contacting the conduit sealingly (the elastomer body can also be deformed elastically) but a part different therefrom, namely a part multi-piece with respect to the elastomer body (not monolithic therewith).

Providing a separate elastic deformation member for the mounting of the two press body parts in a manner allowing the relative movement between the press body parts can for instance be advantageous as the pressure transferred to the elastomer body during the tensioning of the tensioning bolt and a proper mounting of the press seal, thus, can also be evaluated in case of a repeated mounting of the press seal, for instance in case of a substitution of the conduit led through. By providing the elastic deformation element as a separate part decoupled from the elastomer body, the press body can be quite easily adapted for a readout of different force values. Even in case of two press body parts being adapted for a readout of one relative position only, this relative position can be reached at different force values in dependence of the elastic deformation element (its size and/or mechanical properties), which can for instance reduce the number of different parts which have to be provided during manufacturing; therein, "force value" shall not imply that a discrete value can be read out but relates to a region accessible on the basis of the mechanical measurement procedure described here.

The "elastic deformation member" can for instance have a Young's modulus of not more than 1 GPa, in this order increasingly preferred not more than 0.5 GPa, 0.2 GPa, 0.1 GPa, 0.08 GPa, 0.06 GPa, 0.04 GPa, 0.02 GPa or 0.01 GPa; possible lower limits can for instance be 0.0001 GPa or 0.0005 GPa. In general, the elastic deformation element can for instance be intersected by the tensioning bolt or by a readout pin described below.

In a preferred embodiment, the readout member is provided as a readout pin intersecting a through-hole in the first press body part in the relative position; it shall not necessarily intersect the through-hole in the initial state already (prior to the tensioning of the tensioning bolt), possibly not until the relative position has been reached instead, namely a certain force has been reached.

In a preferred embodiment, an opening indicator is provided at the through-hole, preferably an opening indicator closing the through-hole so that the latter is opened by the readout pin in the relative position, which can for instance prevent a dirtying prior to the mounting of the press seal. The opening indicator can for instance be an applied film covering the through-hole (at least partly) or a filler; preferably, however, the opening indicator is one-piece with the first press body part, particularly preferred connected thereto by a material bridge having a reduced thickness (predetermined breaking point) which simplifies the separation. Preferably, the opening indicator can be manufactured at the same time as the first press body part for instance by injection moulding which reduces the effort for manufacturing.

Independent from an opening indicator provided at the first press body part, "the second press body part comprises the readout pin" which means that the readout pin is provided at the second press body part and has a defined relative position thereto in case of the pressing press body part. A vertical projection of the readout pin into a plane perpendicular to the conduit direction can have an area which is rather small in comparison to the contact surface with which the pressing press body part contacts the elastomer body, for instance amount to not more than 20%, 15% or 10% of the latter. Preferably, the readout pin is one-piece with the pressing press body part.

In case of a readout press body part, the second press body part "comprising" the readout pin preferably is the readout pin itself. A vertical projection of the readout pin into a plane perpendicular to the conduit direction can have an area being correspondingly large in comparison to the contact surface with which the readout press body part contacts the elastomer body, for instance amount to at least 50%, 75% or 100% of the latter. The projected area can be even larger than the contact surface, for instance when a guiding stub projecting perpendicularly to the conduit direction is provided at the readout pin, wherein the guiding stub can also be a stop (which is preferred). Also independently of the aforementioned areal relationships, such a second press body part provided as a readout pin is preferably limited in its relative movability by a stop at the first press body part and is held in the press body part therewith.

In case of the pressing press body part and also in case of the readout press body part, the readout pin can have a diameter taken perpendicularly to the conduit direction of preferably at least 1.5 mm, wherein at least 3 mm and at least 4.5 mm are further preferred; upper limits independent therefrom can for instance be 1.5 cm or 1 cm. In general, in this disclosure, the term "diameter" shall not necessarily imply a circular geometry but is meant as a mean value of the smallest and the largest extension (which corresponds to the circle diameter in case of a circular geometry which is preferred).

In a preferred embodiment comprising an elastic deformation member, the latter is at the same time the readout member so that the relative position between the first press body part and the pressing press body part can be read out from the deformation of the elastic deformation member perpendicularly to the conduit direction. When the tensioning bolt is tensioned, the first press body part and the pressing press body part are moved towards each other in the conduit direction wherein the elastic deformation member being preferably arranged in between with respect to the conduit direction is compressed in the conduit direction and expands perpendicularly thereto (however, in general, the elastic deformation member could also be mounted in such a way that it is subjected to a tensile load when the press body parts are moved towards each other). The expansion of the elastic deformation member perpendicularly to the conduit direction can be read out at a defined reference point at the pressing press body part or preferably at the first press body part.

The elastic deformation member can for instance be provided in such a manner that the outer diameter of the elastic deformation member increases by at least 20%, in this order increasingly preferred at least 40%, 60% or 80%, when a force which shall be read out is transferred onto the elastomer body in comparison to the outer diameter of the deformation member in its undeformed state. In numeric values, the press body can for instance be provided in such a manner that the outer diameter has, upon reaching the force (which shall be read out), increased for instance by at least 2 mm, in this order increasingly preferred at least 3 mm, 4 mm, 5 mm, 6 mm, 7 mm, 8 mm, 9 mm or 10 mm. Possible upper limits can for instance be 5 cm or 3 cm and (independently therefrom) in case of the aforementioned percentage quotations for instance 200% or 150%.

In an embodiment of the press body having an elastic deformation member provided as the readout member, a window is provided in the first press body part, wherein the deformation of the elastic deformation member perpendicularly to the conduit direction can be read out at the window. The "window" shall be a region displaced inwards with respect to the outer rim (which lies on the outside with respect to directions perpendicularly to the conduit direction), for instance by at least 5%, 10% or 15% of the diameter of the first press body part; in general, this region can also be open in an outward direction, wherein, however, the region is preferably closed, namely provided as a through-hole in the first press body part.

The press body can for instance be provided in such a way that the elastic deformation member expanding perpendicularly to the conduit direction and appearing in the window indicates the desired force value. Also, a plurality of force values can be read out, namely different states of the expansion of the elastic deformation member perpendicularly to the conduit direction. Those can for instance be read out in a certain region extending perpendicularly to the conduit direction (the states being for instance "empty", "semi-filled", "filled"), the region extending for instance over at least 2 mm, 4 mm, 6 mm or 8 mm, wherein a scale is provided at the window particularly preferred.

Providing a scale can be preferred in general, namely a scale at which different force values can be read out, namely via the readout member. For instance, the scale can be provided at the readout member itself, in particular at a readout pin described above, wherein different relative positions thereof with respect to the first press body part can be read out for instance at an edge of the first press body part. On the other hand, for instance in case of an elastic deformation member being the readout member at the same time, the scale can also be provided at the first press body part, in particular at a window, or at a side of the pressing press body part lying opposite to the contact surface to the elastomer body. At the scale, for instance at least three different force values can be read out (it shall comprise at least three defined marks).

As regards the construction of the press seal, it is preferred in general that the tensioning bolt intersects the elastomer body, wherein another press body is provided at a front face of the elastomer body, which lies opposite to the press body according to the invention having a "force readout member", the other press body having preferably no force readout member. By tensioning the tensioning bolt intersecting the elastomer body (and the press bodies), the two press bodies provided at opposite front faces are moved towards each other, the elastomer body being compressed in the conduit direction accordingly so that it expands perpendicularly thereto and contacts the conduit and an area defining the through-opening sealingly.

Providing a press body having a force readout member can be particularly advantageous in case of an elastomer body assembled of elastomer body parts which are preferably one-piece respectively; therein, the elastomer body parts are connected by a plurality of tensioning bolts intersecting the elastomer body in the conduit direction. Depending on the size taken in the circumferential direction of the through-opening to be sealed, the press seal can be adapted in its corresponding size by adding or removing an elastomer body part.

However, the inventors found out that in practice despite this size adaption a compensation of different distances by the elastomer body deformation can be necessary during the tensioning, namely due to different distances between the conduit and the area defining the through-opening. Further, the force necessary for assuring a sealing contact of the elastomer body can become quite large, for instance amount to at least 6 kN, 9 kN or 17 kN; possible upper limits can for instance be 72 kN, 32 kN or 26 kN. On the one hand, a correspondingly large force can be measured quite well with the mechanical methods disclosed here and, on the other hand, monitoring the large force is necessary because even a minor exceeding could result in a destruction of the elastomer body.

The elastomer body parts of such a modular press seal are complementary to each other pair-wise, preferably they are structurally identical; when the press seal is assembled, to each elastomer body part respectively two elastomer body parts are directly adjacent with respect to the circumferential direction. Seen in the conduit direction, two elastomer body parts being directly adjacent overlap in an overlap region which extends obliquely, preferably perpendicularly, to the conduit direction; a tensioning bolt extending in the conduit direction, preferably solely in the conduit direction, intersects the overlap region and the two next neighbouring elastomer body parts thus, namely connects them.

With respect to a length of the elastomer body taken in the conduit direction, the overlap region shall be preferably arranged centrally, for instance between 30% and 70%, 40% and 60% or 45% and 55% of the elastomer body length taken in the conduit direction. Thus, the part of the respective elastomer body part, which is intersected by the tensioning bolt, is correspondingly long which allows a stable mounting.

In general, in case of an elastomer body intersected in the conduit direction by a tensioning bolt/the tensioning bolts, it is preferred that a projected area of the elastomer body, resulting from a vertical projection of the elastomer body into a plane perpendicular to the conduit direction, is covered to in this order increasingly preferred at least 50%, 60%, 70% or 80% by a contact area or a corresponding plurality of contact areas in case of a plurality of press bodies.

Referring to the contact area which a pressing press body part has at the elastomer body, this contact area can have an area amounting to at least 125%, in this order increasingly preferred at least 110%, 120%, 130% or 140%, of an area of a projected press body part area which results from a vertical projection of the first press body part into a plane perpendicular to the conduit direction. In other words, referring to directions perpendicular to the conduit direction, the pressing press body part is accordingly larger than the first press body part and "spreads open" the force transmitted from the tensioning bolt to the first press body part via a comparably small area originally.

The invention also relates to a set of press seals, which is considered as an invention also independently of the features of claim 1, namely independently of a readout member being provided, and shall be disclosed accordingly. The press bodies of the press seals of the set comprise a tensioning-bolt-contact-press-body-part which is contacted by the tensioning bolt (with respect to different possibilities of the contact, reference is made to the description above relating to the first press body part) and an elastomer-body-contact-press-body-part, the latter contacting the elastomer body with a contact area extending obliquely, preferably perpendicularly, to the conduit direction; the two press body parts are multi-piece to each other, namely not monolithic.

In the set of press seals according to the invention, the press bodies of the set have different elastomer-body-contact-press-body-parts on the one hand; those have different contact areas to the elastomer body, namely contact areas differing for instance by at least 5%, 10%, 15% or 20% (in a pair-wise comparison, the percentage quotation is evaluated with reference to the smaller contact area). On the other hand, the tensioning-bolt-contact-press-body-parts of the press bodies of the press seals of the set are identical to each other. Thus, an "interface" to the tensioning bolt is compatible to a plurality of "interfaces" to the elastomer body so that for instance an installer can adapt the contact area to the specific situation on site. The embodiment "set of press seals" can be particularly advantageous in combination with the dimensioning of the contact areas as disclosed in the paragraph before the previous paragraph and shall be disclosed independently of the feature "readout member" also in this respect.

A pair of a first press body part and a second press body part provided as a pressing press body part, as described above, can also be a pair of a tensioning-bolt-contact-press-body-part and an elastomer-body-contact-press-body-part as just described (as far as the two are multi-piece to each other); thus, a corresponding press body can also be part of a set of press seals (having identical first and different pressing press body part). All features disclosed above for the first and the pressing press body part shall also be disclosed in terms of such a set.

The invention also relates to a set of press seals respectively comprising a first and a second press body part (which can be moved with respect to each other via an elastic deformation member). Therein, the first press body parts are identical to each other, which applies also for the second press body parts; however, the press bodies differ in the elastic deformation member provided respectively. Thus, the elastic deformation members can for instance have different Young's moduli and/or can preferably have a different size, in particular with respect to the size taken in the conduit direction. Likewise, for the press bodies of the set, different force values are adjusted, wherein (since the first and the second press body parts are identical respectively) the different force values are reached in the same relative position. Particularly preferred, the elastic deformation member is assembled in a multi-piece manner (of a plurality of deformation member parts) so that the size taken in the conduit direction can be adjusted by adding or removing a deformation member part.

The invention also relates to a press body for a press seal according to one of the preceding claims, which comprises a readout member at which a force transferred to the elastomer body when tensioning the tensioning bolt can be read out.

Further, the invention relates to using such a press body for a press seal wherein all the features described above for the press seal/the press body shall be also disclosed with respect to such a use.

Below, the invention is explained in further detail, wherein the individual features can be also relevant for the invention in a different combination and shall be disclosed accordingly. Further, also below, the disclosure shall relate to all different claims categories.

BRIEF DESCRIPTION OF THE DRAWINGS

In detail, it shows
FIG. 1 a press body in an oblique view.

DETAILED DESCRIPTION OF THE INVENTION

Figure 1:
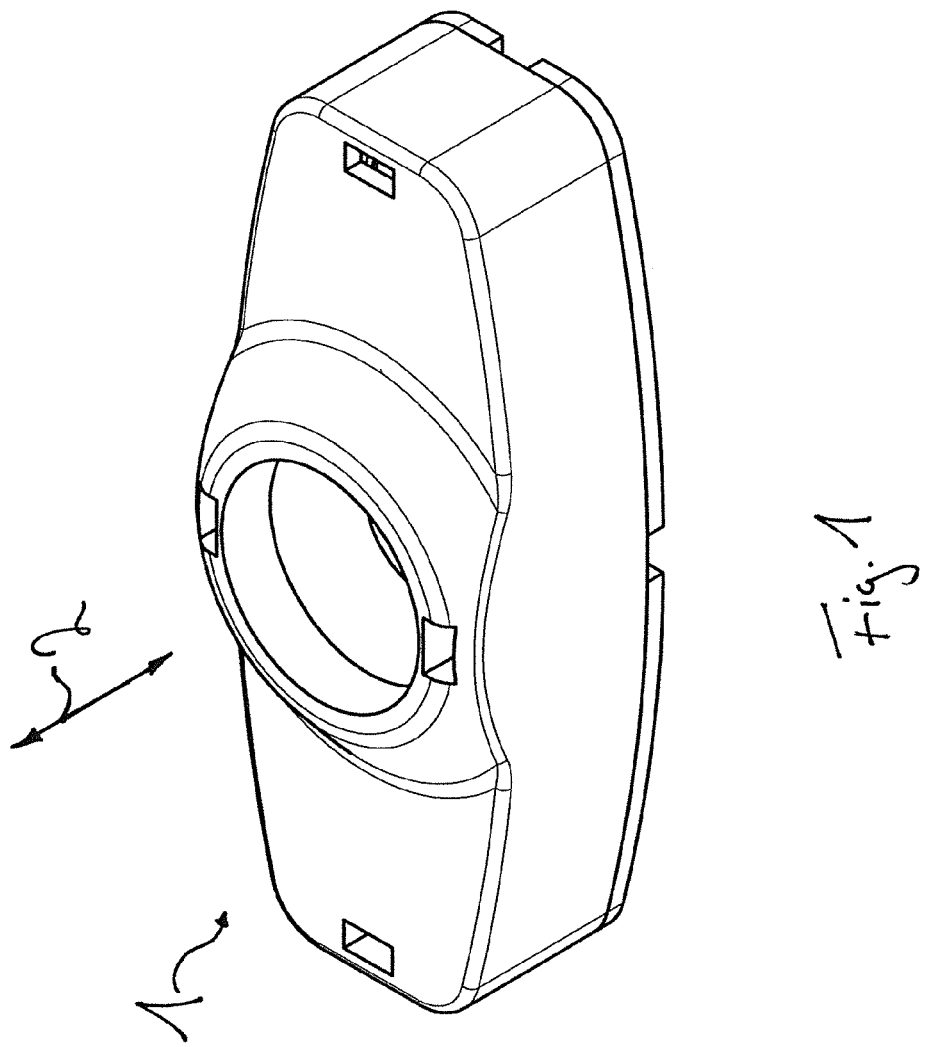

FIG. 1 shows a press body 1 in an oblique view, namely looking onto that side which is opposite to the contact area at the elastomer body. In the press body 1, a through-opening extending in the conduit direction 2 is provided, in which the tensioning bolt is arranged when the press seal is assembled. For an illustration how the press body 1 is provided at the elastomer body, reference is made to FIG. 9 and the corresponding description.

Figure 2:
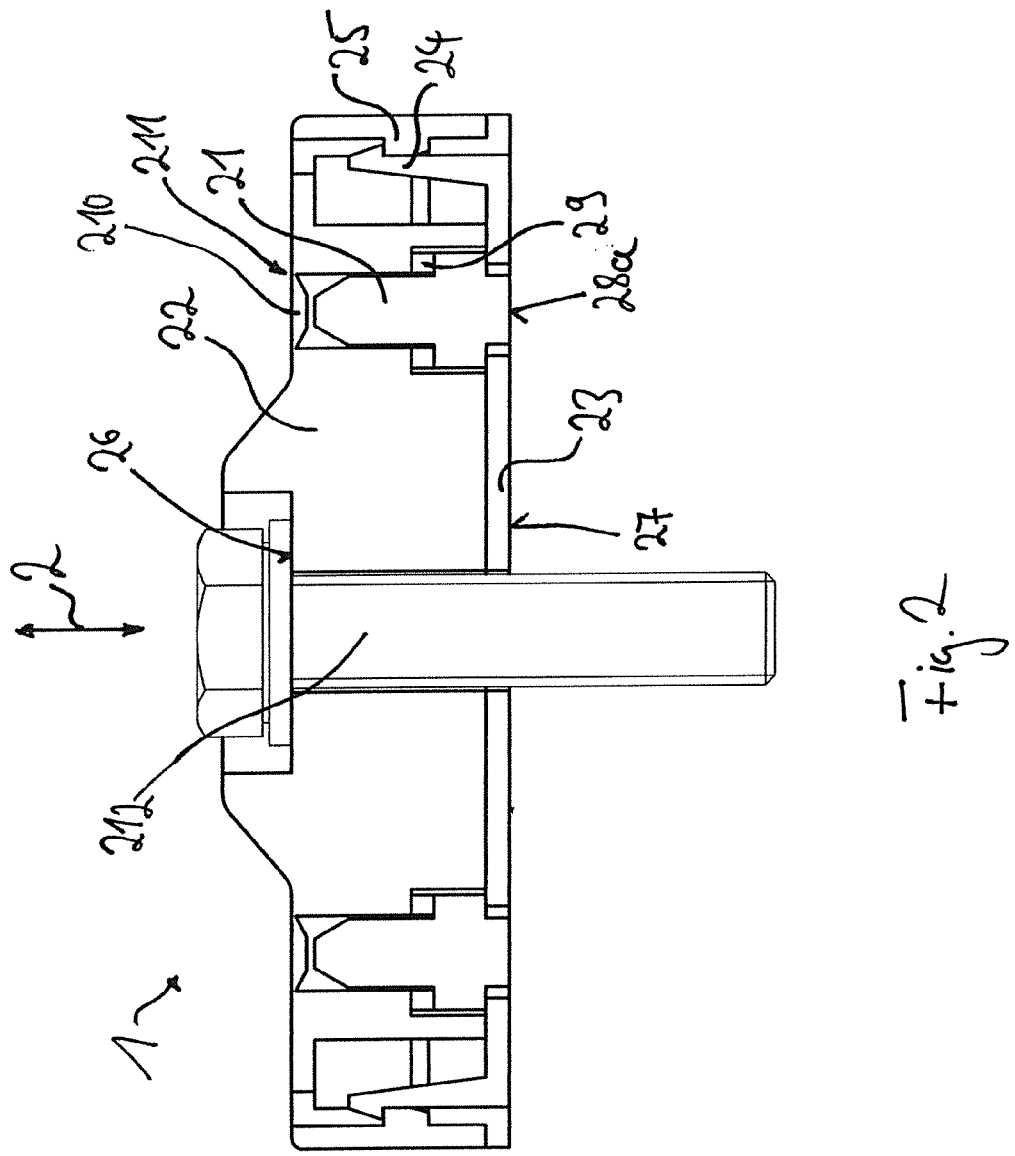
FIG. 2 the press body according to FIG. 1 in a longitudinal section in a side view.

FIG. 2 shows a longitudinal section through the press body 1 and illustrates a readout pin 21 integrated into the press body 1 according to the invention. The press body 1 is assembled from a tensioning-bolt-contact-press-body-part 22 and an elastomer-body-contact-press-body-part 23, wherein the two press body parts 22, 23 are connected by a form-fit in a manner not movable with respect to each other, namely by a tongue 24 extending in the conduit direction 2, which engages behind a projection 25.

When the press seal is assembled, a tensioning bolt 212 contacts a contact area 26 of the tensioning-bolt-contact-press-body-part 22, the contact area extending perpendicularly to the conduit direction 2; the elastomer-body-contact-press-body-part 23 contacts the elastomer body with a contact area 27. Therein, the "tensioning bolt" 212 is the entirety of the threaded shaft with the hexagonal head at the end and the washer. The entirety of the tensioning-bolt-contact-press-body-part 22 and the elastomer-body-contact-press-body-part 23 is the "first press body part" (the same applies for FIG. 7).

The readout pin 21 inserted into the press body 1 is the "second press body part" in this case, namely a readout press body part, and contacts the elastomer body as well but has a small contact area 28a in comparison to the contact area 27. When the elastomer body is compressed in the conduit direction by tensioning the tensioning bolts (see the description relating to FIG. 9), the elastomer body bulges increasingly into the opening in the press body 1, in which the readout pin 21 is held. In the Figure, the elastomer body pushes the readout pin 21 upwards, namely against the force of the elastic deformation element 29.

The hole in the first press body part 22, 23, in which the readout pin 21 is arranged, is still closed at a side lying opposite to the contact areas 27, 28a. The closure provided as an opening indicator 210 is one-piece with the tensioning-bolt-contact-press-body-part 22, wherein a circumferential region having a reduced material thickness is provided as a predetermined breaking point 211 simplifying the removal. Upon reaching a certain force, namely in a certain relative position of the readout pin 21, the opening indicator 210 is pushed out, the readout pin 21 indicating accordingly that the force is reached.

There is also an embodiment possible in which the readout pin 21 is not mounted additionally via the elastic deformation member 29 at the first press body part 22, 23 but is held solely by a closure 210 in the initial position; insofar, the closure 210 would be the deformation member 29 (non-elastic in this case). However, providing an elastic deformation member 29 can be advantageous because the press body 1 can be adapted to different force values by different elastic deformation members 29 wherein the parts are structurally identical apart from that (so that the same mould tool can be used).

In the press body 1 according to FIG. 2, two readout pins 21 are provided which are symmetrical with respect to a mirror plane which lies perpendicular to the drawing plane and contains the center axis of the tensioning bolt 212. For a simplification, in the Figure, only the right side is provided with reference numerals and the description relates thereto mainly.

Figure 3:
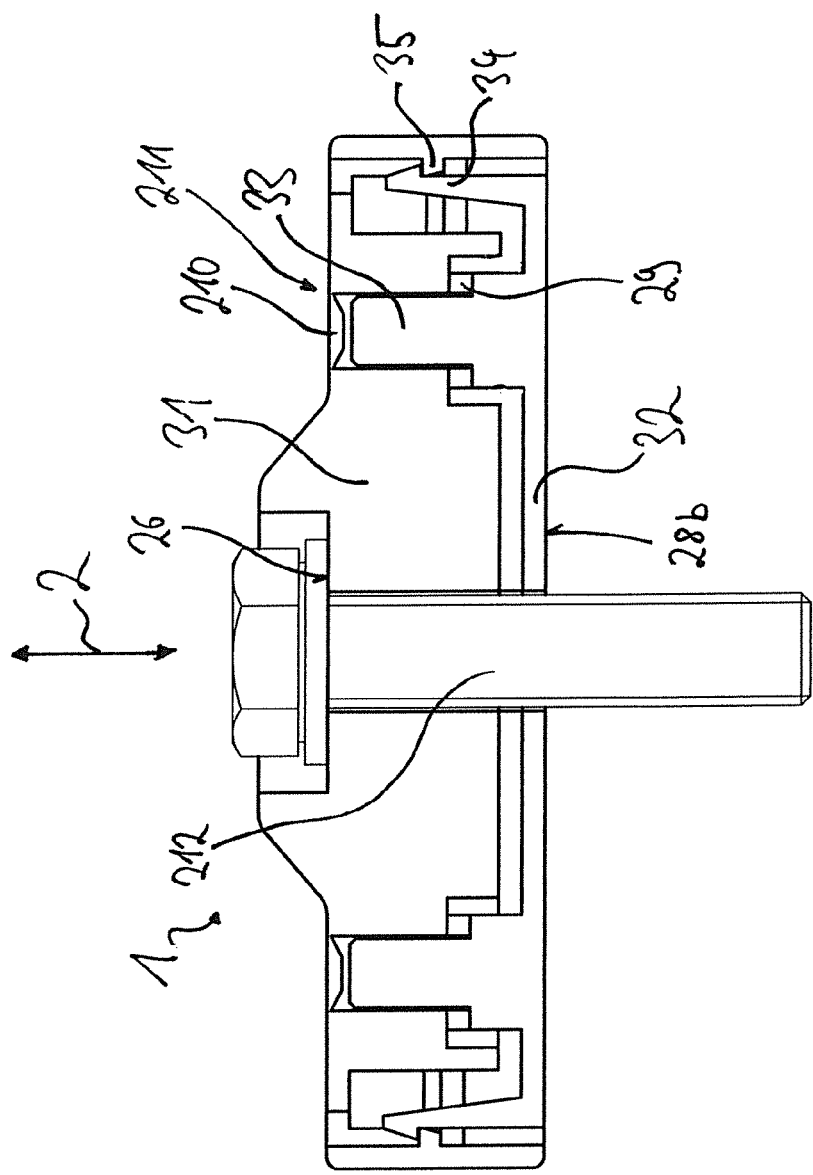
FIG. 3 an alternative embodiment of a press body according to the invention, namely in a longitudinal section in a side view.

FIG. 3 shows a further embodiment of a press body 1 according to the invention; in general, in the Figures, the same reference numerals refer to parts having the same function.

The press body 1 according to FIG. 3 is assembled of a first press body part 31 and a second press body part 32 being movable with respect to the first press body part in the conduit direction 2. The movability of the two press body parts 31, 32 is mounted elastically via the elastic deformation member 29 (as in FIG. 2, the press body 1 is assembled with two readout members symmetrically to a mirror plane, of which only one is referred to for simplification).

When the press seal is assembled, the tensioning bolt 212 contacts the contact area 26 at the first press body part 31 and the second press body part 32 contacts the elastomer body with the contact area 28b. By tensioning the tensioning bolt 212 and pressing the press body 1 onto the elastomer body, the elastic deformation member 29 is increasingly compressed in the conduit direction 2 by the force transferred onto the elastomer body via the contact area 28b. Therein, the first press body part 31 and the second press body part 32 are moved towards each other in the conduit direction 2, wherein a readout pin 33 provided at the second press body part 32 opens the opening indicator 210 upon reaching a relative position different from the initial position. The opening indicator 210 is one-piece with the first press body part 31 and is connected to the remaining first press body part 31 via a material bridge 211 having a reduced thickness. In the initial state, the opening indicator 210 closes the opening in the first press body part 31, in which the readout pin 33 is guided.

For preventing a disassembly of the two press body parts 31, 32 upon a removal of the tensioning bolt 212, namely preventing a handling of individual parts, a tongue 34 provided at the second press body part 32 engages behind a projection 35 at the first press body part 31. The first press body part 31 and the second press body part 32 are locked in place.

Figure 4:
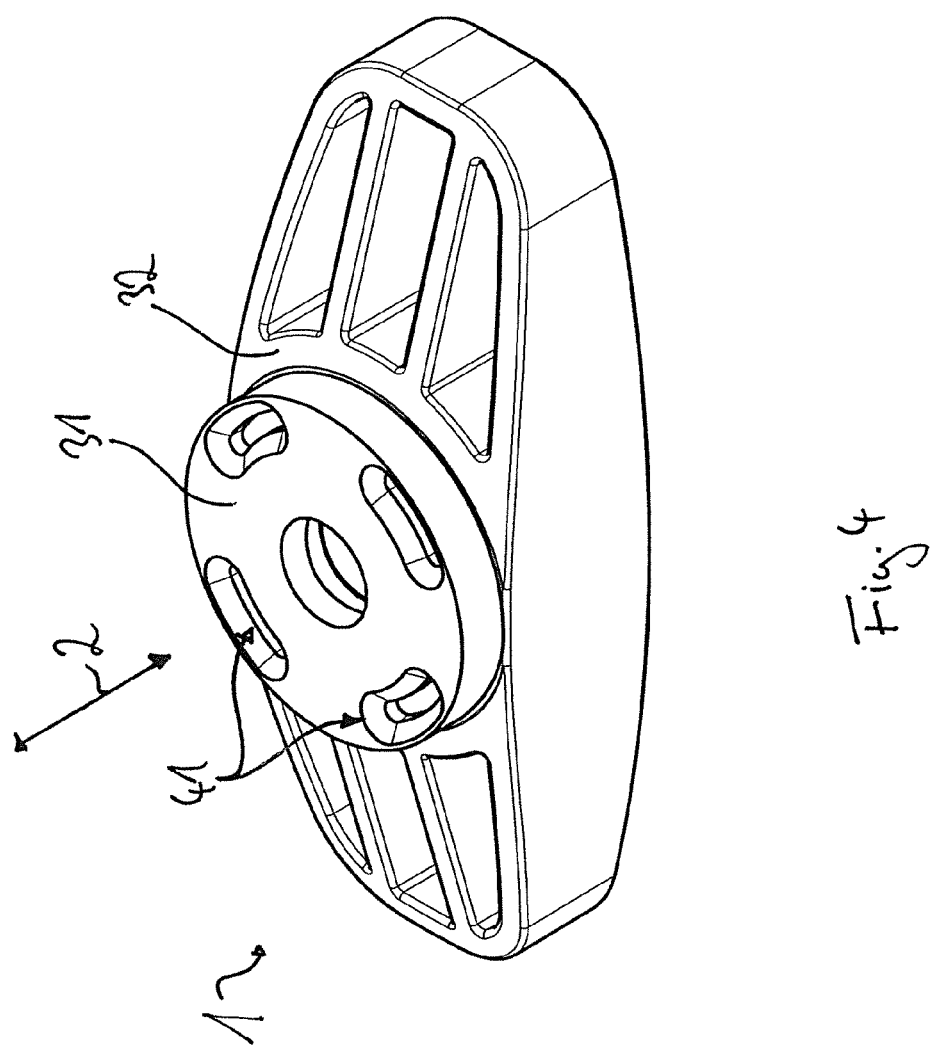
FIG. 4 a further embodiment according to the invention, namely in an oblique view.
Figure 5:
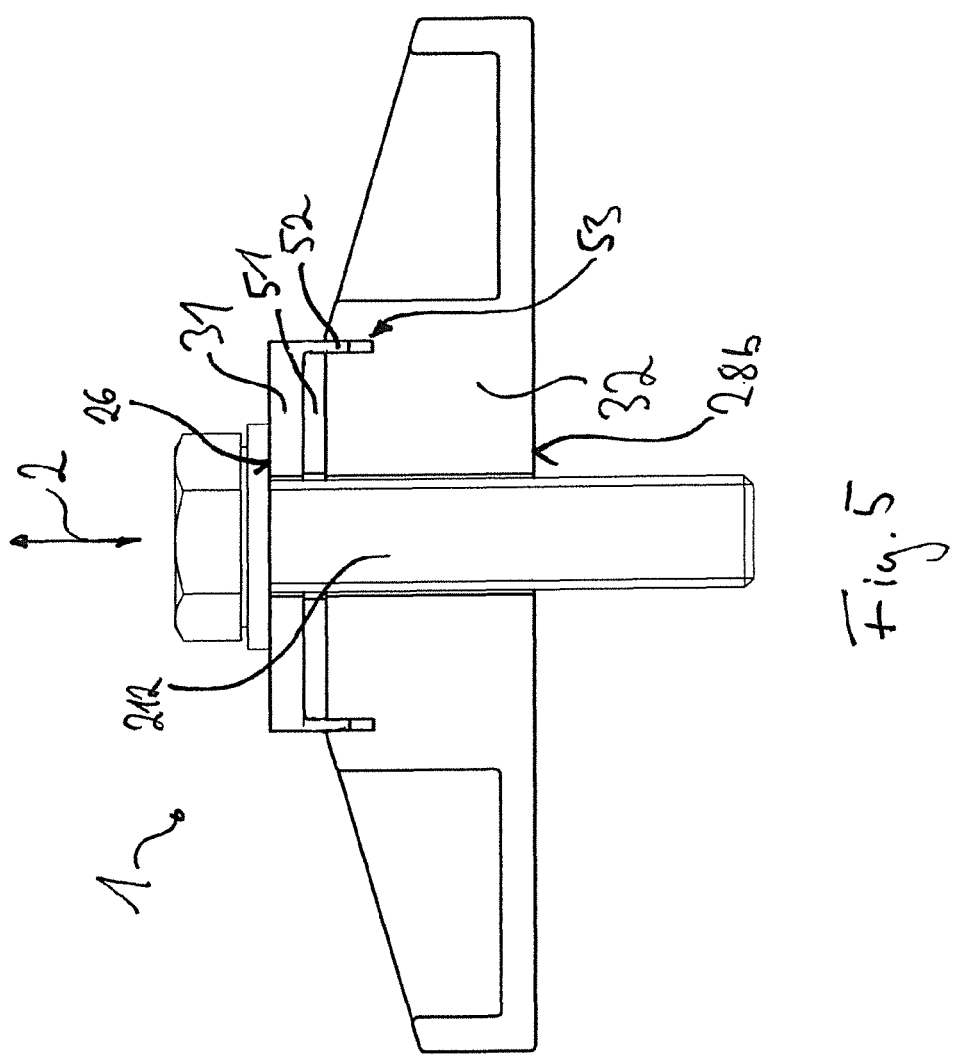
FIG. 5 the embodiment according to FIG. 4, namely in a longitudinal section in a side view.

FIGS. 4 and 5 show a further embodiment of a press body 1 according to the invention, namely in an oblique view (FIG. 4) without tensioning bolt and in a longitudinal section in a side view (FIG. 5) wherein the tensioning bolt 212 is inserted. Also in this embodiment, a first press body part 31 and a second press body part 32 are provided, wherein the first press body part has a contact area 26 for the tensioning bolt 212 and the second press body part has a contact area 28b for the elastomer body.

The two press body parts 31, 32 are movable with respect to each other in the conduit direction 2 in a mounting via the elastic deformation member 51 which is intersected by the tensioning bolt 212. Further, at the first press body part 31, a circumferential projection 52 extending in the conduit direction 2 towards the second press body part 32 is provided, which is adapted for engaging in a complementary recess 53 in the second press body part 32 in the state of being tensioned.

When tensioning the tensioning bolt 212, the two press body parts 31, 32 are moved towards each other in the conduit direction 2, namely against the force of the elastic deformation member 51. In the situation shown in FIG. 5, a certain force and the relative position thus have been reached; in consequence, the elastic deformation member 51 is already compressed in the conduit direction 2 and expanded perpendicularly thereto (when it is not tensioned, it extends perpendicularly to the conduit direction approximately as far as the washer of the tensioning bolt 212).

Due to the expansion perpendicularly to the conduit direction, the elastic deformation member 51 is visible in the windows 41 (FIG. 4) provided in the first press body part 31, which indicates to an installer looking onto the press body 1 in the conduit direction ("from top") that a certain force is reached. On the one hand, the movability of the two press body parts 31, 32 is guided by the projection 52 and the recess 53; on the other hand, the projection 52 engaging in the recess 53 covers the elastic deformation member 51 outwards which can be a certain protection.

Figure 6:
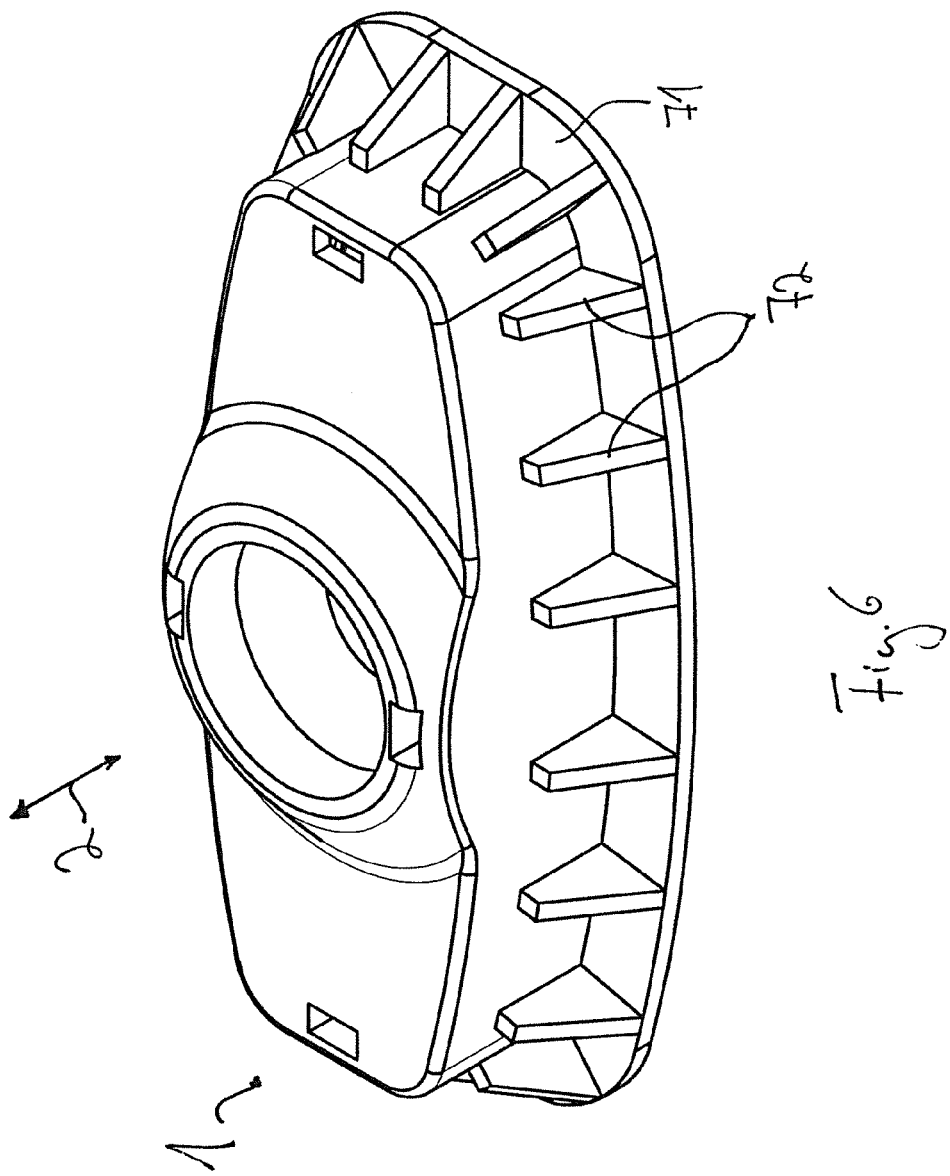
FIG. 6 a further embodiment according to the invention in an oblique view.
Figure 7:
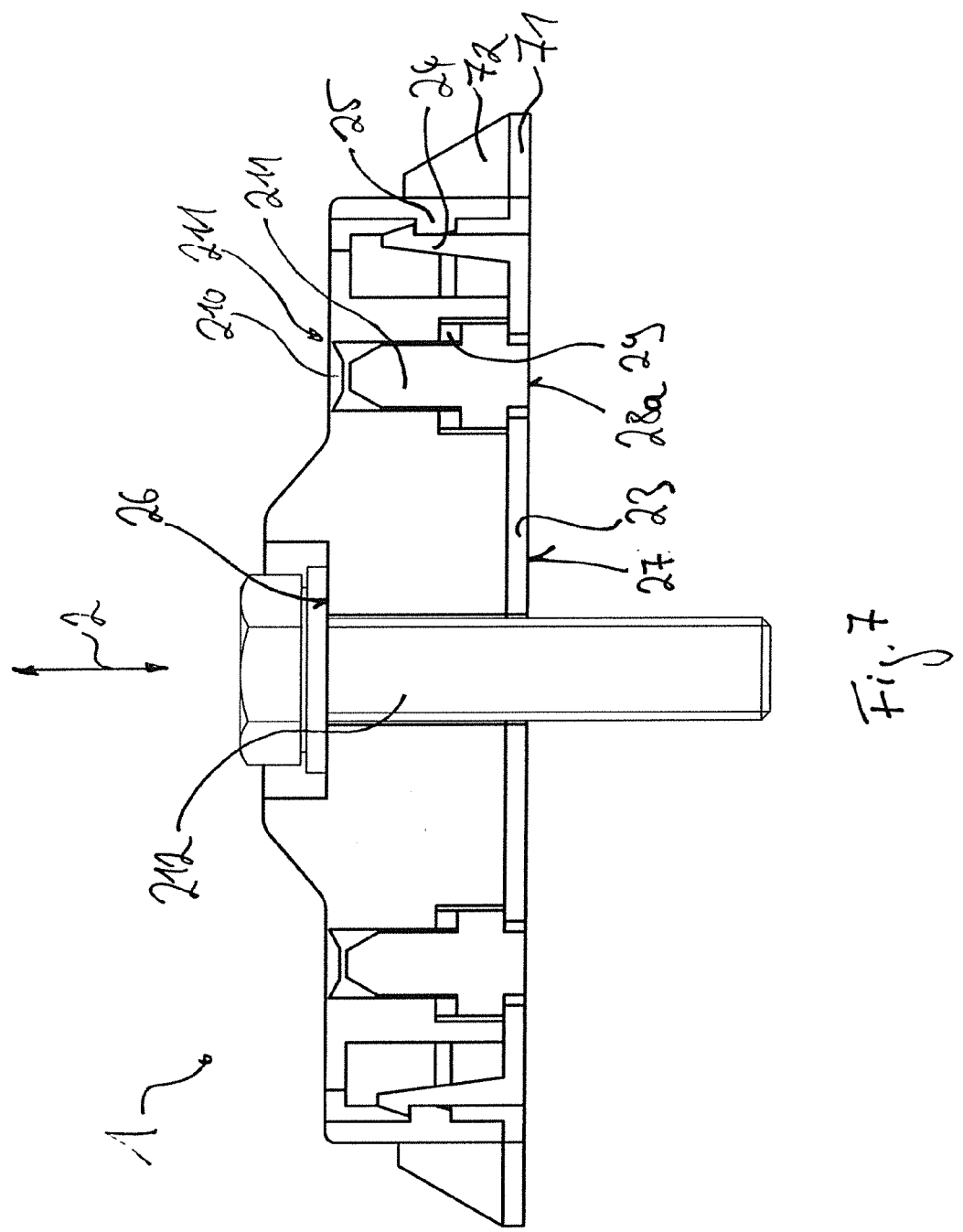
FIG. 7 the embodiment according to FIG. 6, namely in a longitudinal section in a side view.

FIGS. 6 and 7 show a further embodiment which corresponds to the press body 1 explained referring to FIG. 2, as far as the readout member is concerned. Insofar, reference is made to the description above.

However, the embodiment according to FIGS. 6 and 7 differs from that according to FIG. 2 insofar as another elastomer-body-contact-press-body-part 23 is provided, having a larger contact area 27. In consequence, the force is transmitted via a larger area to the elastomer body which can improve the uniformity of the pressing and for instance prevent the elastomer body from "squeezing out" between the press bodies.

For increasing the contact area 27, a circumferential contact area projection 71 is moulded to the elastomer-body-contact-press-body-part 23 of FIG. 7 in comparison to that of FIG. 2, the projection being stabilized by bars 72 with respect to the remaining elastomer-body-contact-press-body-part 23 and transmitting force onto the elastomer body accordingly.

Apart from the size of the contact areas 27, namely apart from the elastomer-body-contact-press-body-parts 23, the press bodies 1 according to FIGS. 2 and 7 do not differ; the remaining parts are identical. The press bodies 1 can be provided in a set of press seals according to the invention.

Figure 8:
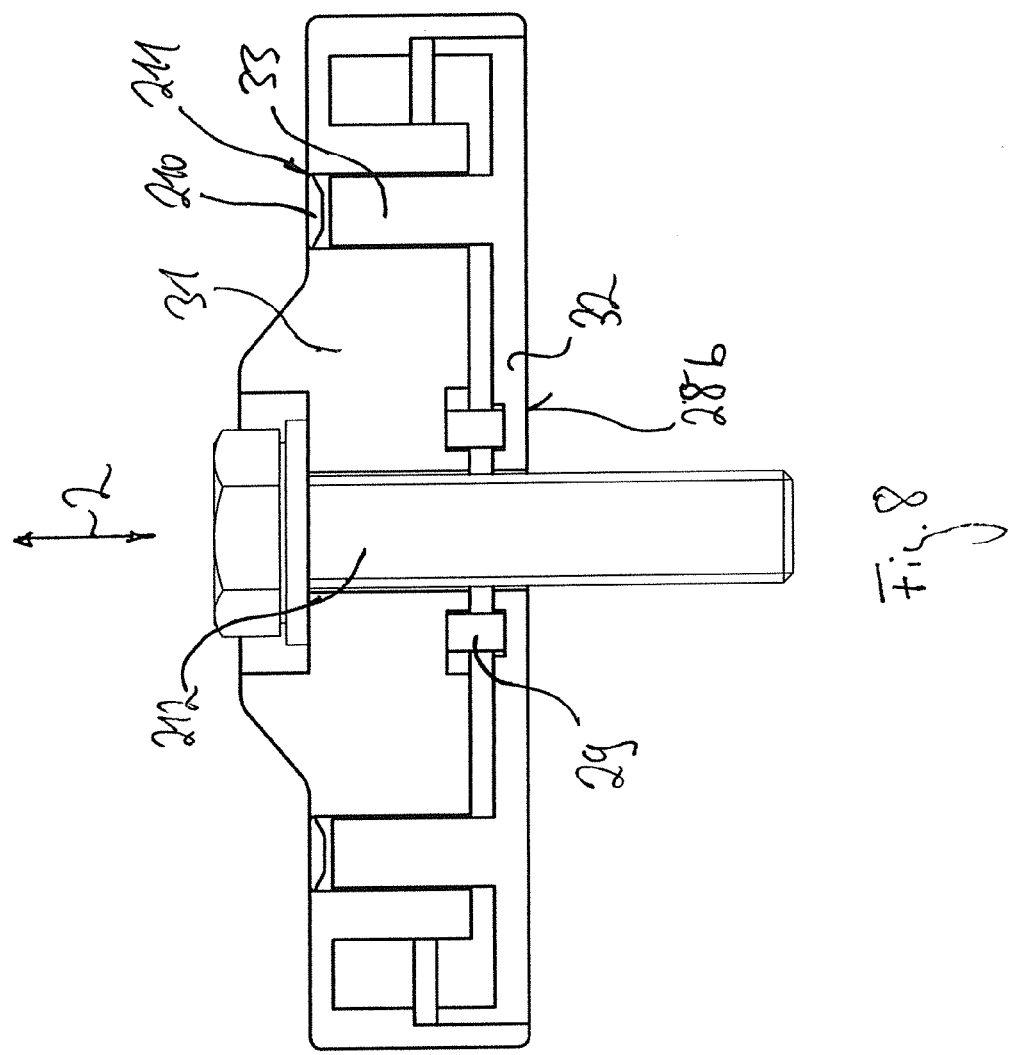
FIG. 8 a further embodiment according to the invention, namely in a longitudinal section in a side view.

FIG. 8 shows a further embodiment having a certain similarity to that of FIG. 3, namely being assembled of a first press body part 31 and a second press body part 32, wherein the press body parts 31, 32 are mounted via an elastic deformation member 29 movable with respect to each other in the conduit direction 2.

In this case, in contrast to the embodiment according to FIG. 3, there are not individual elastic deformation members provided at each of the readout pins 33 respectively (intersected thereof), instead an elastic deformation member 29 is provided and intersected by the tensioning bolt 212. Nevertheless, also in case of the embodiment according to FIG. 8, the contact area 28b is pressed onto the elastomer body upon tensioning the tensioning bolt 212 and the two press body parts 31, 32 are moved towards each other against the force of the elastic deformation member 29. Upon reaching a relative position, the readout pin 33 separates the opening indicator 210 so that an installer can recognize that a force has been reached.

In dependence of the force which shall be read out, a further or further elastic deformation members 29 can be added to the elastic deformation member 29, namely be put side by side in the conduit direction 2. Likewise, the distance between the opening indicator 210 and the readout pin 33 is increased so that accordingly more force has to be transferred onto the elastomer body until the opening indicator is separated.

Figure 9:
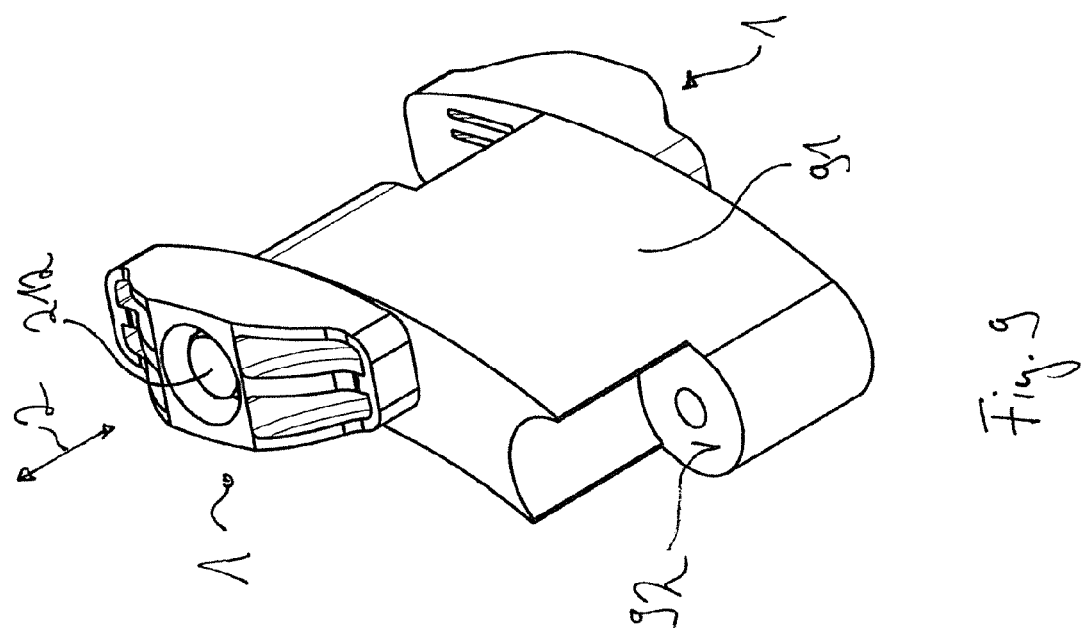
FIG. 9 an elastomer body part of a press seal assembled in a modular manner, with press bodies arranged on both sides with respect to the conduit direction.

FIG. 9 shows a part of a press seal, namely an elastomer body part 91 intersected by a tensioning bolt 212, press bodies 1 being provided at both sides of the elastomer body part with respect to the conduit direction 2. The press body 1 being visible from top in the oblique view has no readout member and is arranged opposite to a press body 1 described above (with readout member).

The press seal is assembled of a plurality of such elastomer body parts 91 which are complementary to each other. Thus, two further elastomer body parts are arranged at the elastomer body part 91 and connected thereto, one of the further elastomer body parts being arranged in front of and the other one behind. From a corresponding arrangement, a closed chain of elastomer body parts 91 results which would be on the top left in FIG. 9.

Two elastomer body parts 91 lying directly adjacent to each other contact each other in an overlap region 92 oriented perpendicularly to the conduit direction 2 and are connected to each other by a tensioning bolt 212 intersecting the overlap region (and the two elastomer body parts 91 thus).

By tensioning the tensioning bolt 212 holding the elastomer body parts 91 at each other, the elastomer body is compressed in the conduit direction and expands perpendicularly thereto, namely contacts a conduit (not shown) and the soffit of a wall opening (not shown). Therein, a press body 1 according to the invention indicates that a force required for an optimal sealing contact has been reached.

The invention claimed is:

1. A press body (1),
adapted for a press sealing having
an elastomer body (91) for contacting a conduit sealingly,
said press body (1) and
a tensioning bolt (212) for tensioning said press body (1),
wherein said press body (1) can be pressed onto said elastomer body (91) by tensioning said tensioning bolt (212) in such a way that said elastomer body contacts said conduit sealingly,
and wherein further said press body (1) comprises a read out member at which a force transmitted to said elastomer body (1) during said tensioning of said tensioning bolt (212) can be read out, wherein further said press body (1) comprises a first press body part (22, 23, 31), a second press body part (21, 32) and a deformation member (29, 51), wherein said first press body part (22, 23, 31) is adapted for a contact with said tensioning bolt (212) so that said tensioning bolt (212) transmits a force onto said first press body part (22, 23, 31) during said tensioning and said second press body part (21, 32) is adapted for contacting said elastomer body with a contact surface (28a,b) and wherein further said first press body part (22, 23, 31) and said second press body part (21, 32) are adapted for being movable relatively to each other via said deformation member (29, 51) as a bearing and are adapted for being in a relative position in dependence of said force transmitted to said elastomer body (91), wherein said relative position can be read out at said read out member, characterized in that said deformation member (29, 51) is different from said elastomer body (91).

2. The press body (1) according to claim 1, wherein a read out pin (21, 33) is provided as said read out member, wherein said press body (1) is adapted for said read out pin (21, 33) extending through a through hole in said first press body part (22, 23, 31) in said relative position.

3. The press body (1) according to claim 1 having an opening indicator (210) provided at said through hole and closing the later preferably, said opening indicator (210) being adapted for being opened by said read out pin (21, 33) in said relative position.

4. The press body (1) according to claim 1, wherein said contact surface (28b) has an area amounting to at least 50% of the area of a projected area of said press body, said projected area resulting from a vertical projection of the whole press body (1) into a plane perpendicular to said conduit direction (2).

5. The press body (1) according to claim 4, wherein said area of said contact surface (28b) amounts to at least 125% of the area of a projected area of a press body part, said projected press body part area resulting from a vertical projection of said first press body part (31) into a plane perpendicular to said conduit direction (2).

6. The press body (1) according to claim 4, wherein said deformation member (51) is an elastic deformation member (51), said elastic deformation member (51) itself being said read out member, wherein said relative position can be read out from said deformation of said elastic deformation member (51) perpendicularly to said conduit direction (2).

7. The press body (1) according to claim 6 having a window (41) in said first press body part (31), wherein said deformation of said elastic deformation member (51) perpendicularly to said conduit direction can be read out at said window.

8. The press body (1) according to claim 1, wherein a scale is provided at said press body (1), wherein a plurality of force values transmitted to said elastomer body (91) can be read out at said scale by said read out member.

9. A press seal having a press body (1) according to claim 1, an elastomer body (91) for contacting a conduit sealingly and a tensioning bolt (212) tensioning said press body (1), wherein said press body (1) can be pressed onto said elastomer body (91) by tensioning said tensioning bolt (212) in such a way that said elastomer body (91) contacts said conduit sealingly.

10. The press seal according to claim 9, wherein said elastomer body (91) is made of a plurality of elastomer body parts (91) being provided complementary to each other and being composable in such a way that, when being composed, seen in said conduit direction (2), an elastomer body part (91) overlaps at each of its ends with respect to a circumferential direction with respectably another elastomer body part (91) being directly adjacent with respect to said circumferential direction, namely overlaps respectively in an overlap region (92) oriented obliquely to said conduit direction (2), wherein said elastomer body parts being directly adjacent are connected to each other by a tensioning bolt (212) intersecting said respective overlap region (92).

11. A set of press seals with a plurality of press seals according to claim 9, said press seals having respectively a press body (1) with a tensioning-bolt-contact-press-body-part (22) being adapted for a contact with said tensioning bolt (212) and an elastomer-body-contact-press-body-part (23) multipart to said tensioning-bolt-contact-press-body-part, said elastomer-body-contact-press-body-part being adapted for contacting said elastomer body with a contact surface (27, 28b), wherein said press bodies (1) of said press seals of said set have different elastomer-body-contact-press-body-parts (23) but have identical tensioning-bolt-contact-press-body-parts (22).

12. A set of press seals with a plurality of press seals according to claim 9, wherein said first press body parts (22, 23, 31) and said second press body parts (21, 32) of said press bodies (1) of said press seals of said set are identical to each other respectively, but said press bodies (1) of said press seals of said set are equipped with different elastic deformation members (29, 51).

13. A method of constructing the press seal of claim 9 comprising utilizing the press body (1).

* * * * *